(12) United States Patent
Nishi et al.

(10) Patent No.: US 12,147,098 B2
(45) Date of Patent: Nov. 19, 2024

(54) PLASMONIC WAVEGUIDE

(71) Applicant: Nippon Telegraph and Telephone Corporation, Tokyo (JP)

(72) Inventors: Hidetaka Nishi, Tokyo (JP); Shinji Matsuo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 304 days.

(21) Appl. No.: 17/628,494

(22) PCT Filed: Jul. 24, 2019

(86) PCT No.: PCT/JP2019/028997
§ 371 (c)(1),
(2) Date: Jan. 19, 2022

(87) PCT Pub. No.: WO2021/014606
PCT Pub. Date: Jan. 28, 2021

(65) Prior Publication Data
US 2022/0269114 A1  Aug. 25, 2022

(51) Int. Cl.
*G02F 1/035* (2006.01)
(52) U.S. Cl.
CPC .................................. *G02F 1/035* (2013.01)
(58) Field of Classification Search
None
See application file for complete search history.

(56) References Cited

U.S. PATENT DOCUMENTS

| | | | |
|---|---|---|---|
| 9,864,109 B2 | 1/2018 | Lee et al. | |
| 2010/0260461 A1* | 10/2010 | Shimizu | G02F 1/035 385/130 |
| 2013/0071083 A1* | 3/2013 | Kim | G02B 6/12 385/131 |

(Continued)

FOREIGN PATENT DOCUMENTS

| | | | |
|---|---|---|---|
| JP | 2018511084 A | 4/2018 | |
| KR | 20080083921 A | 9/2008 | |

OTHER PUBLICATIONS

Haffner, C. et al., "Low-Loss Plasmon-Assisted Electro-Optic Modulator," Nature, Research Letter, Apr. 25, 2018, 17 pages.

(Continued)

*Primary Examiner* — Chad H Smith
(74) *Attorney, Agent, or Firm* — SLATER MATSIL, LLP

(57) ABSTRACT

An embodiment plasmonic waveguide includes a first metal layer formed on a substrate, an electro-optic thin film formed on the first metal layer and including a material having an electro-optic effect, and a second metal layer formed on the electro-optic thin film. In an embodiment, a waveguide region in which the first metal layer and the second metal layer overlap each other in a direction normal to a planar surface of the substrate (layer stacking direction), the waveguide region extending in the planar surface direction of the substrate, is included. For example, the first metal layer and the second metal layer are formed only in the waveguide region, and each of respective widths of the first metal layer and the second metal layer is equal to a width of an overlap between the first metal layer and the second metal layer.

12 Claims, 2 Drawing Sheets

(56) References Cited

U.S. PATENT DOCUMENTS

2014/0105553 A1    4/2014  Kim et al.
2018/0081204 A1*   3/2018  Ma ........................ G02F 1/0027

OTHER PUBLICATIONS

Melikyan, A. et al., "High-Speed Plasmonic Phase Modulators," Nature Photonics, Feb. 16, 2014, 5 pages.
Messner, A. et al., "Integrated Ferroelectric Plasmonic OpticalModulator," Optical Society of America, Mar. 19, 2017, 3 pages.

* cited by examiner

PLASMONIC WAVEGUIDE

This patent application is a national phase filing under section 371 of PCT application no. PCT/JP2019/028997, filed on Jul. 24, 2019, which application is hereby incorporated herein by reference.

TECHNICAL FIELD

The present invention relates to a plasmonic waveguide.

BACKGROUND

To create ultracompact high-speed optical waveguide-type devices intended to apply to ultra-high-speed optical communication or terahertz wave communication, plasmonic waveguides capable of confining light into a sub-wavelength size have been attracting attention. Among those, plasmonic waveguide-type optical phase shifters are extremely compact, highly efficient and high speed in comparison with conventional dielectric waveguide-type phase shifters. Therefore, by use of plasmonic waveguide-type optical phase shifters, optical modulators including optical circuits, such as a Mach-Zehnder interferometer (MZI) and a ring resonator, with the phase shifters incorporated therein and having a frequency response of 100 GHz or more, have been demonstrated.

For plasmonic waveguide-type phase shifters, as stated below, plasmonic waveguides of a horizontal MEM structure in which a core made of a material having an electro-optic effect is sandwiched from right and left between two metal layers on a substrate are used.

First, in each of the phase shifters in Non-Patent Literatures 1 and 2, as illustrated in FIG. 6, a configuration in which a layer 204 of an electro-optical polymer is formed on and between a metal layer 202 and a metal layer 203 formed on a substrate 201 with a space therebetween is disclosed. A plasmonic waveguide is formed from the metal layer 202 and the metal layer 203, and a core 205 made of the electro-optical polymer and sandwiched between the metal layer 202 and the metal layer 203. With light having a wavelength of 1.55 μm in an optical communication wavelength band made to propagate in the plasmonic waveguide, a modulation voltage is applied between the metal layer 202 and the metal layer 203 to modulate a refractive index of the core 205 by means of an electro-optic effect and thereby modulate a phase of the light propagating from the near side toward the far side on the sheet of FIG. 6.

Also, in the phase shifter of Non-Patent Literature 3, as illustrated in FIG. 7, a ferroelectric layer 213 made of $BaTiO_3$ is formed on a substrate 211 with an intervening $Al_2O_3$ layer 212, and a metal layer 215 and a metal layer 216 are formed in such a manner as to sandwich a core 214 formed in a rib-like shape of the ferroelectric layer 213. With light having a wavelength of 1.55 μm in an optical communication wavelength band made to propagate in a plasmonic waveguide having this horizontal structure of the metal layer 215, the core 214 and the metal layer 216, a modulation voltage is applied between the metal layer 215 and the metal layer 216 to modulate a refractive index of the core 214 of $BaTiO_3$ by means of an electro-optic effect and thereby modulate a phase of the light propagating from the near side toward the far side in the sheet of FIG. 7.

Also, in the phase shifter of Patent Literature 1, as illustrated in FIG. 8, a configuration in which a layer 225 of a transparent conductive oxide film is formed on and between a metal layer 222 and a metal layer 223 formed on a substrate 221 with a space therebetween, with an intervening $Al_2O_3$ layer 224 is disclosed. A plasmonic waveguide is formed from the metal layer 222 and the metal layer 223, and a core 226 made of the transparent conductive oxide film sandwiched between the metal layer 222 and the metal layer 223. With light having a wavelength of 1.55 μm in an optical communication wavelength band made to propagate in the plasmonic waveguide, a modulation voltage is applied between the metal layer 222 and the metal layer 223 to modulate a refractive index of the core 226 by means of an electro-optic effect and thereby modulate a phase of the light propagating from the near side toward the far side on the sheet of FIG. 8.

CITATION LIST

Patent Literature

Patent Literature 1: U.S. Pat. No. 9,864,109

Non-Patent Literature

Non-Patent Literature 1: A. Melikyan et al., "High-speed plasmonic phase modulators", Nature Photonics, vol. 8, pp. 229-233, 2014.

Non-Patent Literature 2: C. Haffner et al., "Low-loss plasmon-assisted electro-optic modulator", Nature, vol. 556, pp. 483-486, 2018.

Non-Patent Literature 3: A. Messner et al., "Integrated Ferroelectric Plasmonic Optical Modulator", Optical Society of America, Th5C.7, 2017.

SUMMARY

Technical Problem

However, the aforementioned techniques have the below-stated manufacture problems.

In Non-Patent Literatures 1 and 2 and Patent Literature 1, in order to fabricate a horizontal MEM structure, first, right and left metal structures of a plasmonic waveguide are fabricated mainly using a liftoff process, and subsequently an electro-optical polymer or a transparent conductive oxide material is deposited and thereby fills the space between the right and left metal layers to fabricate the MEM structure. In this case, the electro-optical polymer or the transparent conductive oxide material needs to be a material that can be deposited later and fill a minute void between metals, and thus, there are constraints on the material to be used.

Also, in Non-Patent Literature 3, in order to fabricate a horizontal MEM structure, first, a ferroelectric thin film layer is deposited on a planar surface, and subsequently, a core that is several tens of nanometers wide and deep is formed using lithography and dry etching processes, and metal layers are fabricated on the right and left of the core using liftoff processes. In this case, extremely fine processing of the ferroelectric layer is needed.

An embodiment of the present invention, which may solve the aforementioned problems, facilitates manufacturing of a plasmonic waveguide using a material having an electro-optic effect.

Means for Solving the Problem

A plasmonic waveguide according to embodiments of the present invention includes: a first metal layer formed on a substrate; an electro-optic thin film formed on the first metal layer and formed of a material having an electro-optic effect; a second metal layer formed on the electro-optic thin film; and a waveguide region in which the first metal layer and the second metal layer overlap each other in a direction normal to a planar surface of the substrate, the waveguide region extending in the planar surface direction of the substrate.

Effects of Embodiments of the Invention

As stated above, according to embodiments of the present invention, a waveguide region in which an electro-optic thin film is sandwiched between a first metal layer and a second metal layer and the first metal layer and the second metal layer overlap each other, in a direction in which the layers are stacked on a substrate, is provided, facilitating manufacturing of a plasmonic waveguide using a material having an electro-optic effect.

DETAILED DESCRIPTION OF ILLUSTRATIVE EMBODIMENTS

Figure 1:
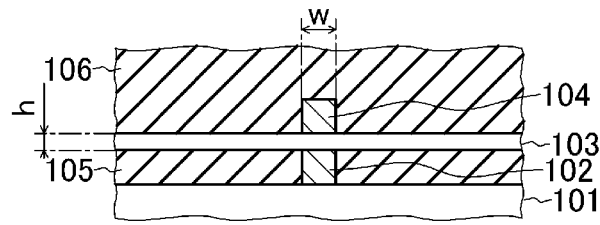
FIG. 1 is a sectional view illustrating a configuration of a plasmonic waveguide according to an embodiment of the present invention.

A plasmonic waveguide according to an embodiment of the present invention will be described below with reference to FIG. 1. The plasmonic waveguide includes a first metal layer 102, an electro-optic thin film 103 and a second metal layer 104. The first metal layer 102 is formed on a substrate 101. The electro-optic thin film 103 is formed on the first metal layer 102 and is made of a material having an electro-optic effect. The second metal layer 104 is formed on the electro-optic thin film 103. The substrate 101 can be made of, for example, an insulation material. Also, for the substrate 101, for example, an SOI (silicon-on-insulator) substrate can be used.

For the material having an electro-optic effect, a general electro-optic material that has what is called a first-order or second-order electro-optic effect and can be formed into a uniform thin film having an area sufficient for device fabrication, by means of, e.g., a smart cut method or a polishing method can be used.

Examples of the material having an electro-optic effect include ferroelectric perovskite oxide crystals such as $BaTiO_3$, $LiNbO_3$, $LiTaO_3$, KTN ($KTa_{1-x}Nb_xO_3$) and KLTN ($K_{1-y}Li_yTa_{1-x}Nb_xO_3$). The examples of the material having an electro-optic effect also include cubic perovskite oxide crystals such as KTN ($KTa_{1-x}Nb_xO_3$), KLTN ($K_{1-y}Li_yTa_{1-x}Nb_xO_3$), $BaTiO_3$, $SrTiO_3$ and $Pb_3MgNb_2O_9$.

The examples of the material having an electro-optic effect also include, e.g., KDP crystals and sphalerite crystals. The examples of the material having an electro-optic effect also include electro-optical polymers (Reference Literature 1: W. Heni et al., "Nonlinearities of organic electro-optic materials in nanoscale slots and implications for the optimum modulator design", Optics Express, vol. 25, no. 3, pp. 2627-2653, 2017). Also, for the material having an electro-optic effect, a semiconductor crystal such as Si, GaAs, InP, GaN, GaP or any of other III-V or II-VI multi-element mixed crystals can be used in order to utilize extremely strong light confinement by the plasmonic waveguide and use a higher-order non-linear optical effect.

Each of the first metal layer 102 and the second metal layer 104 needs to be made of a metal that can generate surface plasmon polaritons (SPPs) at an interface with the electro-optic thin film 103 when the plasmonic waveguide is formed, and for example, can be made of, e.g., Au, Ag, Al, Cu or Ti.

Also, in the embodiment, an upper cladding layer 106 formed in such a manner as to cover a region of the electro-optic thin film 103 except a part of the region, the second metal layer 104 being formed on the part, and to cover the second metal layer 104 is provided. Also, a lower cladding layer 105 formed in a region between the substrate 101 and the electro-optic thin film 103 except a part of the region, the first metal layer 102 being formed on the part, is provided. Each of the lower cladding layer 105 and the upper cladding layer 106 can be made of, for example, silicon oxide ($SiO_2$).

Here, a waveguide region in which the first metal layer 102 and the second metal layer 104 overlap each other in a direction normal to a planar surface of the substrate 101 (layer stacking direction), the waveguide region extending in the planar surface direction of the substrate 101 (direction from the near side toward the far side on the sheet of FIG. 1), is provided. In this example, the first metal layer 102 and the second metal layer 104 are formed in such a manner as to have a same width and extend in a waveguide direction and are disposed at a same position on the substrate 101, in plan view. In this example, the first metal layer 102 and the second metal layer 104 are formed only in the waveguide region, and the width of the first metal layer 102 and the second metal layer 104 is equal to a width of the overlap between the first metal layer 102 and the second metal layer 104.

According to the embodiment, a plasmonic waveguide of an MEM structure is formed by the electro-optic thin film 103 being sandwiched in the waveguide region in which the first metal layer 102 and the second metal layer 104 overlap each other, in the direction in which the layers are stacked on the substrate. Application of a modulation voltage between the first metal layer 102 and the second metal layer 104 enables modulating of a refractive index of the electro-optic thin film 103 sandwiched in the waveguide region and thereby modulating a phase of light propagating from the near side toward the far side on the sheet of FIG. 1.

According to the embodiment, the electro-optic thin film 103 can be formed with no need for formation of a fine structure. A thickness of the electro-optic thin film 103 is a height of a core included in a vertical plasmonic waveguide and is a parameter for determining a light confinement coefficient and an effective refractive index of the plasmonic waveguide. Also, the thickness of the electro-optic thin film 103 (core height h) is a parameter for determining an intensity of an electric field applied to the electro-optic thin film 103 when a voltage is applied to the first metal layer 102 and the second metal layer 104. Therefore, the electro-optic thin film 103 is designed elaborately and is fabricated using a fabrication process that enables film thickness control with extremely high accuracy.

Also, a shape of the first metal layer 102 and the second metal layer 104 in section (core width w) is a parameter for determining the light confinement coefficient and the effective refractive index of the plasmonic waveguide, and thus, the first metal layer 102 and the second metal layer 104 are fabricated using a fabrication process that enables extremely highly accurate control of a pattern width.

Figure 2:
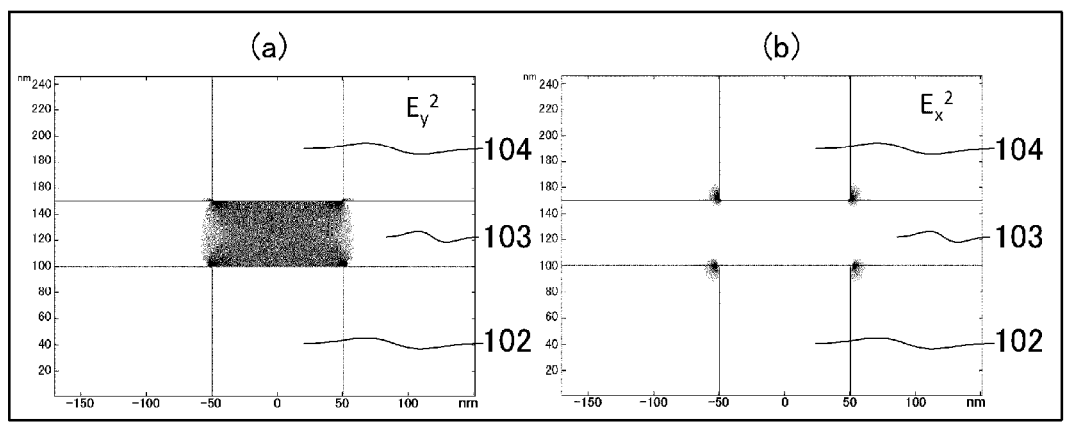
FIG. 2 includes distribution charts indicating a light propagation mode of the plasmonic waveguide according to an embodiment of the present invention, which were obtained via calculation according to a finite element method.

FIG. 2 indicates contour plots of electric field intensity ($Ex^2$, $Ey^2$) distributions in directions perpendicular to the substrate in the plasmonic waveguide, which were obtained by calculation according to a finite element method. For the electro-optic thin film 103, lithium niobate (LN) was used, and for the first metal layer 102 and the second metal layer 104, aluminum (Al) was used. Also, a wavelength of guided light was 1.55 μm. Also, the core height h was 50 nm and the width w was 100 nm. In this example, a light propagation mode in which light is strongly confined is obtained inside the electro-optic thin film 103 sandwiched in the waveguide region in which the first metal layer 102 and the second metal layer 104 overlap each other. Note that for a crystal orientation of the material having an electro-optic effect (crystalline material) forming the electro-optic thin film 103, it is necessary to select an orientation in which a change in effective refractive index of the propagation mode is maximized by superposition integration of the electric field intensity and the electro-optic tensor in the light propagation mode.

Figure 3:
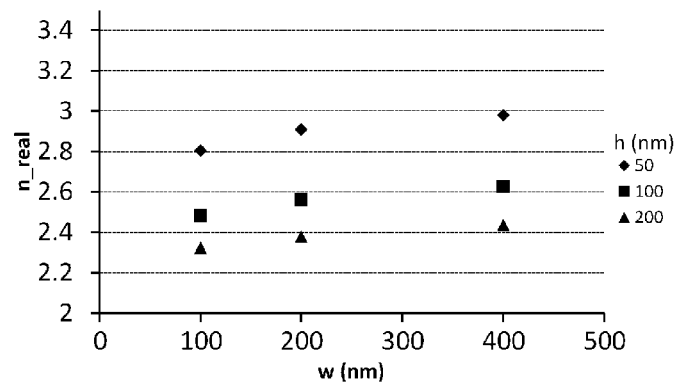
FIG. 3 is a characteristic diagram indicating change of an effective refractive index of the light propagation mode in relation to a core height and a core width of the plasmonic waveguide according to an embodiment of the present invention.

FIG. 3 indicates effective refractive indexes of the light propagation mode of the plasmonic waveguide according to an embodiment, which were calculated with different core heights h and core widths w. As illustrated in FIG. 3, it can be understood that the effective refractive index of the light propagation mode can be controlled by adjusting the thickness of the electro-optic thin film 103 (core height h) and the width of the part in which the first metal layer 102 and the second metal layer 104 overlap each other (core width w). It is possible to, in consideration of the effective refractive index, design optical circuits for an optical modulator, such as a Mach-Zehnder interferometer and a ring resonator, with optical phase shifters incorporated therein, the optical phase shifters being based on the plasmonic waveguide according to embodiments of the present invention.

Also, in input/output of light to the plasmonic waveguide according to embodiments of the present invention using an optical coupling structure of optical coupling with a dielectric optical waveguide such as one described in Reference Literature 2 (A. Melikyan et al., "Photonic-to-plasmonic mode converter", Optics Letters, vol. 39, no. 12, pp. 3488-3491, 2014), as described with reference to FIG. 3, a light coupling mode of light coupling with the dielectric optical waveguide is designed by structurally controlling the effective refractive index, enabling obtainment of a favorable optical coupling structure.

More detailed description will be provided below using examples.

Example 1

First, Example 1 will be described with reference to FIG. 4. The present plasmonic waveguide includes a first metal layer 102a formed on a substrate 101, an electro-optic thin film 103 formed on the first metal layer 102a, and a second metal layer 104a formed on the electro-optic thin film 103. The present plasmonic waveguide also includes a waveguide region in which the first metal layer iota and the second metal layer 104a overlap each other in a direction normal to a planar surface of the substrate 101, the waveguide region extending in the planar surface direction of the substrate 101 (direction from the near side to the far side on the sheet of FIG. 4). The present plasmonic waveguide also includes an upper cladding layer 106a formed in such a manner as to cover a region of the electro-optic thin film 103 except a part of the region, the second metal layer 104a being formed on the part, and to cover the second metal layer 104a. The present plasmonic waveguide also includes a lower cladding layer 105a formed in a region between the substrate 101 and the electro-optic thin film 103 except a part of the region, the first metal layer iota being formed on the pall.

Figure 4:
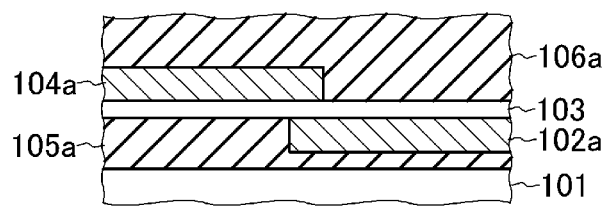
FIG. 4 is a sectional view illustrating a configuration of a plasmonic waveguide of Example 1 of embodiments of the present invention.

In Example 1, also, the waveguide region in which the first metal layer iota and the second metal layer 104a overlap each other in the direction normal to the planar surface of the substrate 101, the waveguide region extending in the planar surface direction of the substrate 101 (direction from the near side to the far side on the sheet of FIG. 4), is provided. Here, in Example 1, the first metal layer 102a is formed in such a manner as to extend on one side of the waveguide region and the second metal layer 104a is formed in such a manner as to extend on the other side of the waveguide region. In Example 1, a core width of the plasmonic waveguide does not correspond to respective widths of the first metal layer 102a and the second metal layer 104a in plan view and is determined by the region of the overlap between the first metal layer 102a and the second metal layer 104a. Therefore, accuracy of the core width of the plasmonic waveguide is determined not based on accuracy of formation of the respective pattern widths of the first metal layer 102a and the second metal layer 104a but based on positions at which the first metal layer 102a and the second metal layer 104a are formed.

Manufacture of the plasmonic waveguide of Example 1 will briefly be described. First, a Si substrate with an electro-optic thin film formed thereon with an intervening $SiO_2$ layer is prepared. The electro-optic thin film can be formed with good accuracy in such a manner as to have a desired thickness (design thickness), by use of, for example, a well-known smart cut method, which is widely used for SOI substrate fabrication.

Next, a metal film is formed on the electro-optic thin film and the metal film is patterned to form a first metal layer. For the formation of the first metal layer, a patterning technique such as a well-known liftoff method or a general dry etching method can be used. A thickness of the first metal layer is set to be a thickness that makes an intensity on the substrate side sufficiently small in an SPP electric field distribution inside the first metal layer. For example, the thickness of the first metal layer can be 100 nm.

Next, a film of a dielectric material (for example, $SiO_2$), which becomes a lower cladding layer, is formed on the first metal layer. For example, the lower cladding layer can be formed by depositing $SiO_2$ via, e.g., a general plasma CVD method, a thermal CVD method or a low-pressure CVD method. Also, the lower cladding layer can be formed by applying, e.g., a refractive index adjustment-type polymer or a well-known coating-type insulation film via a spin coating method.

After the lower cladding layer being formed as above, in order to reduce a level difference due to the first metal layer, which is an underlying layer at this point of time, and achieve a surface roughness that is tolerable for a later-described joining process, a surface of the lower cladding layer is flattened. For example, where $SiO_2$ is deposited as the lower cladding layer, the lower cladding layer needs to be flattened so as to have a surface roughness of no more than 1 nm using a well-known chemical mechanical polishing (CMP) method.

Subsequently, a separate substrate (other substrate) is prepared. The other substrate can be, for example, a Si substrate including an $SiO_2$ layer at a surface thereof. Here, where a Si waveguide is used for an input/output optical waveguide for the plasmonic waveguide according to embodiments of the present invention, the other substrate includes a Si waveguide fabricated based on an SOI substrate, and furthermore, in a state in which an $SiO_2$ layer, which serves as an upper cladding layer, in the silicon waveguide, has been formed, a surface of the $SiO_2$ layer is flattened using the well-known CMP process in order to achieve a surface roughness that is tolerable for the later-described joining process.

Next, in order to make the aforementioned Si substrate with the flattening of the lower cladding layer completed and the other substrate face each other, the surface of the lower cladding layer and the surface of the $SiO_2$ layer are joined. In this joining process, for example, if $SiO_2$ is used for the lower cladding layer, it is necessary to use well-known surface hydrophilic direct-bonding.

After the joining as described above, the Si substrate and the $SiO_2$ layer used for formation of the electro-optic thin film are removed via, for example, wet etching to make a surface of the electro-optic thin film be exposed on the other substrate. At this stage, the first metal layer and the lower cladding layer are formed between the other substrate and the electro-optic thin film. Note that the $SiO_2$ layer may appropriately remain slightly on the surface of the electro-optic thin film in consideration of light confinement and electrical insulation.

Next, a second metal layer is formed on the electro-optic thin film. At the same time, an upper electrode of an optical phase shifter provided by a Si waveguide formed in another region can be formed. In formation of the second metal layer, in order to form a part of an overlap with the first metal layer, which becomes a waveguide region, the second metal layer is positioned with extremely high accuracy relative to a position at which the first metal layer is formed. After the second metal layer is formed with high accuracy of positioning relative to the first metal layer, an $SiO_2$ layer, a refractive index adjustment-type polymer layer and a coating-type insulation film layer, which become an upper cladding, are appropriately formed.

Example 2

First, Example 2 will be described with reference to FIG. 5. The present plasmonic waveguide includes a first metal layer 102b, formed on a substrate 101, an electro-optic thin film 103 formed on the first metal layer 102b, and a second metal layer 104 formed on the electro-optic thin film 103. The plasmonic waveguide also includes a waveguide region in which the first metal layer 102b and the second metal layer 104 overlap each other in a direction normal to a planar surface of the substrate 101, the waveguide region extending in a planar surface direction of the substrate 101 (direction from the near side to the far side on the sheet of FIG. 5). The plasmonic waveguide also includes an upper cladding layer 106 formed in such a manner as to cover a region of the electro-optic thin film 103 except a part of the region, the second metal layer 104 being formed on the part, and to cover the second metal layer 104.

Figure 5:
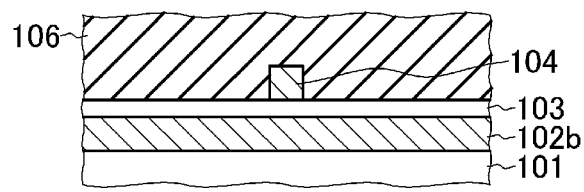
FIG. 5 is a sectional view illustrating a configuration of a plasmonic waveguide of Example 2 of embodiments of the present invention.
Figure 6:
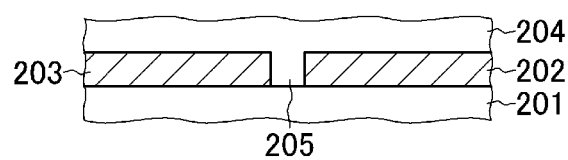
FIG. 6 is a sectional view illustrating a configuration of a plasmonic waveguide using a material having an electro-optic effect.
Figure 7:
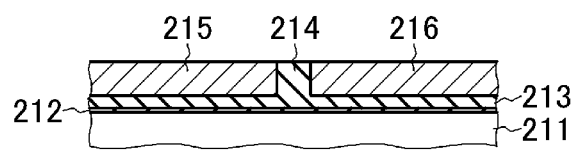
FIG. 7 is a sectional view illustrating a configuration of a plasmonic waveguide using a material having an electro-optic effect.
Figure 8:
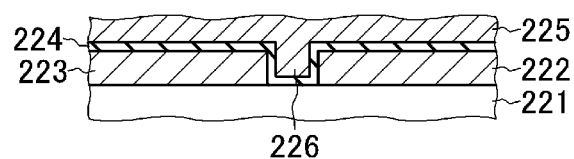
FIG. 8 is a sectional view illustrating a configuration of a plasmonic waveguide using a material having an electro-optic effect.

In Example 2, also, the waveguide region in which the first metal layer 102b, and the second metal layer 104 overlap each other in the direction normal to the planar surface of the substrate 101, the waveguide region extending in the planar surface direction of the substrate 101 (direction from the near side to the far side on the sheet of FIG. 5), is provided. Here, like the electro-optic thin film 103, the first metal layer 102b is formed on an entire region of the substrate 101, and on the other hand, the second metal layer 104 is formed only in the waveguide region. In Example 2, the region of the overlap between the first metal layer 102b and the second metal layer 104 (waveguide region) is the part of the second metal layer 104, and a core width of the plasmonic waveguide is determined by a width of the second metal layer 104 in plan view.

Manufacture of the plasmonic waveguide of Example 2 will briefly be described. First, a Si substrate with an electro-optic thin film formed thereon with an intervening $SiO_2$ layer is prepared. The electro-optic thin film can be formed with good accuracy in such a manner as to have a desired thickness (design thickness), by use of, for example, a well-known smart cut method, which is widely used for SOI substrate fabrication.

Next, a metal film is formed as a first metal layer on the electro-optic thin film. The first metal layer of Example 2 can be provided by, for example, forming a metal film to an entire region of the Si substrate as the first metal layer without patterning. Note that a thickness of the first metal layer is set to a thickness that makes an intensity on the substrate side sufficiently small in an SPP electric field distribution inside the first metal layer. For example, the thickness of the first metal layer can be 100 nm.

Subsequently, a separate substrate (other substrate) is prepared, and a thin metal layer made of a metal that is the same as that of the first metal layer is formed on a surface of the other substrate. Next, in order to make the Si substrate with the first metal layer formed thereon and the other substrate with the thin metal layer formed thereon face each other, a surface of the first metal layer and a surface of the thin metal layer are joined. As a result of the joining, the first metal layer and the thin metal layer are integrated and form a first metal layer as a whole.

After the joining as described above, the Si substrate and the $SiO_2$ layer used for formation of the electro-optic thin film are removed via, for example, wet etching to make a surface of the electro-optic thin film be exposed on the other substrate. At this stage, the first metal layer is formed between the other substrate and the electro-optic thin film. Note that the $SiO_2$ layer may appropriately remain slightly on the surface of the electro-optic thin film in consideration of light confinement and electrical insulation.

Next, a second metal layer is formed on the electro-optic thin film. At the same time, an upper electrode of an optical phase shifter provided by a Si waveguide formed in another region can be formed. In Example 2, a region in which the second metal layer is formed becomes a waveguide region, and thus, highly accurate positioning is not necessary for formation of the second metal layer. For formation of the second metal layer, a patterning technique such as a well-known liftoff method or a general dry etching method can be used. A thickness of the second metal layer can be 100 nm. After the second metal layer is formed, an $SiO_2$ layer, a refractive index adjustment-type polymer layer and a coating-type insulation film layer, which become an upper cladding, are appropriately formed.

A configuration in which the first metal layer is formed only in the waveguide region and the second metal layer is formed in the entire region of the substrate like the electro-optic thin film can be employed.

As described above, according to embodiments of the present invention, a waveguide region in which an electro-optic thin film is sandwiched between a first metal layer and a second metal layer and the first metal layer and the second metal layer overlap each other, in a direction in which the layers are stacked on a substrate is provided, facilitates manufacturing of a plasmonic waveguide using a material having an electro-optic effect.

Note that embodiments of the present invention are not limited to the above-described embodiment, but many alterations and combinations can be made by a person having common knowledge in the relevant field, within the technical idea of the present invention.

REFERENCE SIGNS LIST

101 Substrate
102 First metal layer
103 Electro-optic thin film
104 Second metal layer
105 Lower cladding layer
106 Upper cladding layer

The invention claimed is:

1. A plasmonic waveguide comprising:
a first metal layer over a substrate;
an electro-optic thin film directly contacting the first metal layer and comprising a material having an electro-optic effect;
a second metal layer directly contacting the electro-optic thin film; and
a waveguide region defined by an overlap region in which the first metal layer and the second metal layer overlap each other in a direction normal to a planar surface of the substrate, the waveguide region extending in a planar surface direction of the substrate,
wherein:
the first metal layer is in a first metal layer area over the substrate that includes the overlap region and a first non-overlap region outside the waveguide region,
the second metal layer is in a second metal layer area that includes the overlap region and a second non-overlap region outside the waveguide region, and
the first non-overlap region and the second non-overlap region are on opposite sides of the waveguide region and do not overlap each other in the direction normal to the planar surface of the substrate.

2. The plasmonic waveguide according to claim 1, wherein the second metal layer is on a portion of the electro-optic thin film, and wherein the plasmonic waveguide further comprises an upper cladding layer over the electro-optic thin film and over the second metal layer on the portion of the electro-optic thin film.

3. The plasmonic waveguide according to claim 1, further comprising a lower cladding layer on the substrate, the lower cladding layer extending between the substrate and the electro-optic thin film in a first region and extending between the substrate and a bottom surface of the first metal layer in a second region.

4. The plasmonic waveguide according to claim 3, wherein the first metal layer extends between an upper surface of the lower cladding layer and a lower surface of the electro-optic thin film in the second region.

5. A plasmonic waveguide comprising:
a first metal layer over a substrate;
a thin film directly contacting the first metal layer, the thin film comprising a material having an electro-optic effect;
a second metal layer directly contacting the thin film;
a waveguide region defined by an area in which the first metal layer and the second metal layer overlap each other in a direction normal to a planar surface of the substrate, the waveguide region extending in a planar surface direction of the substrate; and
an upper cladding layer over the thin film and the second metal layer,
wherein:
the first metal layer is in a first metal layer area over the substrate that includes the area in which the first metal layer and the second metal layer overlap each other and a first non-waveguide region outside the waveguide region,
the second metal layer is in a second metal layer area that includes the area in which the first metal layer and the second metal layer overlap each other and a second non-waveguide region outside the waveguide region, and
the first non-waveguide region and the second non-waveguide region are on opposite sides of the waveguide region and do not overlap each other in the direction normal to the planar surface of the substrate.

6. The plasmonic waveguide according to claim 5, further comprising a lower cladding layer between the substrate and the thin film, wherein the first metal layer is over the lower cladding layer in the waveguide region and in the first non-waveguide region.

7. The plasmonic waveguide according to claim 5, further comprising a lower cladding layer on the substrate and extending to the thin film in a first region and extending to a bottom surface of the first metal layer in a second region.

8. A method of forming a plasmonic waveguide, the method comprising:
forming a first metal layer over a substrate;
forming an electro-optic thin film directly contacting the first metal layer, the electro-optic thin film comprising a material having an electro-optic effect; and
forming a second metal layer directly contacting the electro-optic thin film, wherein:
a waveguide region is defined by an overlap region in which the first metal layer and the second metal layer overlap each other in a direction normal to a planar surface of the substrate, the waveguide region extending in a planar surface direction of the substrate,
the first metal layer is in a first metal layer area over the substrate that includes the overlap region and a first non-overlap region outside the waveguide region,
the second metal layer is in a second metal layer area that includes the overlap region and a second non-overlap region outside the waveguide region, and
the first non-overlap region and the second non-overlap region are on opposite sides of the waveguide region and do not overlap each other in the direction normal to the planar surface of the substrate.

9. The method according to claim 8, further comprising forming an upper cladding layer over the electro-optic thin film and the second metal layer.

10. The method according to claim 9, further comprising forming a lower cladding layer on the substrate, the lower cladding layer extending between the substrate and the electro-optic thin film in a first region and extending between the substrate and a bottom surface of the first metal layer in a second region, wherein the first metal layer extends between an upper surface of the lower cladding layer and a lower surface of the electro-optic thin film in the second region.

11. The method according to claim 8, further comprising forming a lower cladding layer on the substrate, the lower cladding layer extending between the substrate and the electro-optic thin film in a first region and extending between the substrate and a bottom surface of the first metal layer in a second region.

12. The method according to claim 11, wherein the first metal layer extends between an upper surface of the lower cladding layer and a lower surface of the electro-optic thin film in the second region.

* * * * *